US008743116B1

(12) United States Patent
Horowitz et al.

(10) Patent No.: US 8,743,116 B1
(45) Date of Patent: Jun. 3, 2014

(54) SHADER NETWORK

(75) Inventors: Daniel Horowitz, Bellevue, WA (US);
David Floyd Aronson, Woodinville, WA (US); Jonathan Thomas Steed, Redmond, WA (US); Paul Lawrence Bleisch, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1182 days.

(21) Appl. No.: 11/361,546

(22) Filed: Feb. 24, 2006

(51) Int. Cl.
*G06T 15/50* (2011.01)
*G06T 15/60* (2006.01)
*G09G 5/00* (2006.01)

(52) U.S. Cl.
USPC ........... 345/426; 345/582; 345/589; 345/619; 345/581

(58) Field of Classification Search
None
See application file for complete search history.

(56) References Cited

U.S. PATENT DOCUMENTS

| | | | | |
|---|---|---|---|---|
| 5,793,374 | A * | 8/1998 | Guenter et al. | 345/426 |
| 6,496,190 | B1 * | 12/2002 | Driemeyer et al. | 345/619 |
| 6,657,624 | B2 * | 12/2003 | Olano | 345/426 |
| 7,176,917 | B1 * | 2/2007 | Morgan et al. | 345/426 |
| 2002/0032697 | A1 * | 3/2002 | French et al. | 707/500.1 |
| 2005/0140672 | A1 * | 6/2005 | Hubbell | 345/426 |
| 2005/0273773 | A1 * | 12/2005 | Gold et al. | 717/139 |
| 2007/0091090 | A1 * | 4/2007 | Zhang | 345/426 |

OTHER PUBLICATIONS

Robert L. Cook, "Shade Trees," Jul. 1984, ACM SIGGRAPH Computer Graphics, vol. 18 No. 3, pp. 223-231.*
Gregory D. Abram, Turner Whitted, "Building Block Shaders," Aug. 1990, ACM SIGGRAPH Computer Graphics, vol. 24 No. 4, pp. 283-288.*
Randima Fernando, Mark J. Kilgard, "The Cg Tutorial: The Definitive Guide to Programmable Real-Time Graphics," Feb. 26, 2003, pp. 2-4, 31, 283-290.*
Mauricio Breternitz Jr., Herbert H. J. Hum, Sanjeev Kumar, "Compilation, Architectural Support, and Evaluation of SIMD Graphics Pipeline Programs on a General-Purpose CPU," Sep. 27, 2003, Proceedings of the 12th International Conference on Parallel Architectures and Compilation Techniques.*
Andrew M. Phelps et al, "An Introduction to Programming in M.U. P.P.E.T.S. Laboratory" in "An Open-Source CVE for Programming Education: A Case Study", A presentation of work from the Multi-User Programming Pedagogy for Enhancing Traditional Study (M.U. P.P.E.T.S.) project at SIGGRAPH 2005.*
Hengzhong Wen, "Development and implementation of web based training for tinker air force base", Master thesis, University of Oklahoma, Norman, Oklahoma, 2002.*

* cited by examiner

*Primary Examiner* — Tize Ma
(74) *Attorney, Agent, or Firm* — Aaron Chatterjee; Andrew Sanders; Micky Minhas (57) ABSTRACT

A system and methods for providing shading effects include a shading network possessing the ability to create, maintain, and incrementally evolve shading techniques and effects. The shader network provides the ability to encapsulate CPU and GPU code into a self-contained node that can be transported between renderers. As a result, authors can develop reusable shading techniques that can express the wide range of effects available via utilization of CPU and GPU code. The shader network also provides the capability to compose multiple nodes into a reusable "macro" node that affords authors the ability to build derivative shading effects without the need to modify an application's renderer or constituent nodes.

18 Claims, 9 Drawing Sheets

SHADER NETWORK

TECHNICAL FIELD

The technical field generally relates to computer graphics and more specifically relates to rendering shading effects.

BACKGROUND

As real-time graphics rendering techniques become more expressive, there is a trend to develop more technically complex shading techniques. This increase in complexity is a result of a desire to express more visually complex imagery. Many artists express complex imagery via the use of shading techniques. This expression is currently limited in several ways by existing shading systems. Current real time shading systems allow a single author to create an entire shading technique. Current real time systems however, do not typically allow authors to compose disparate portions of previously-authored shading techniques into a new, unique technique. Thus, authors are limited by the amount of time they can devote to each individual shading technique because authors cannot easily add additional functionality to shading techniques without completely authoring all aspects of the new technique. Further, reuse of shading techniques by different shading systems is limited because shading techniques developed under one shading system are not fully portable to another shading system.

Most interesting shading techniques today require a certain amount of central processing unit (CPU) and graphics processing unit (GPU) code to help orchestrate the various steps of the effect. For example, rendering real-time shadows could involve rendering the entire scene several times while varying CPU and/or GPU state and code to be executed. A problem with current shading systems however, is the lack of support for CPU and GPU code. Complex shading techniques often require sophisticated, author-written CPU code and/or GPU code to be executed in the context of an application's graphics renderer. Shading systems that support CPU code integration often do not have full portability to other renderers because the CPU code is specific to an individual host renderer. Often the CPU code is physically integrated into the renderer code itself.

SUMMARY

This Summary is provided to introduce a selection of concepts in a simplified form that are further described below in the Detailed Description Of The Illustrative Embodiments. This Summary is not intended to identify key features or essential features of the claimed subject matter, nor is it intended to be used to limit the scope of the claimed subject matter.

A system for providing rendering effects includes a shading network (also referred to as a shader network) having the ability to create, maintain, and incrementally evolve shading techniques and effects. The evolving techniques and effects can be developed using libraries of existing shading techniques. The shader network provides the capability for authors to encapsulate CPU and GPU code into a self-contained node that can be transported between renderers. As a result, authors can develop reusable shading techniques that can express the wide range of effects available via utilization of CPU and GPU code.

The shader network also provides the capability for an author to compose multiple nodes into a reusable "macro" node that affords authors the ability to build derivative shading effects without the need to modify an application's renderer or constituent nodes. The shader network reduces the amount of CPU and GPU behavior code that a node author must write. Further, nodes within a shader network can execute another shader network. This indirect execution of a shader network forms a basis on which loop and control flow constructs can be exposed without complicating the execution model of the shader network.

BRIEF DESCRIPTION OF THE DRAWINGS

The foregoing summary, as well as the following detailed description, is better understood when read in conjunction with the appended drawings. For the purpose of illustrating shader network, there is shown in the drawings exemplary constructions thereof; however, shader network are not limited to the specific methods and instrumentalities disclosed. In the drawings.

DETAILED DESCRIPTION OF ILLUSTRATIVE EMBODIMENTS

Figure 1:
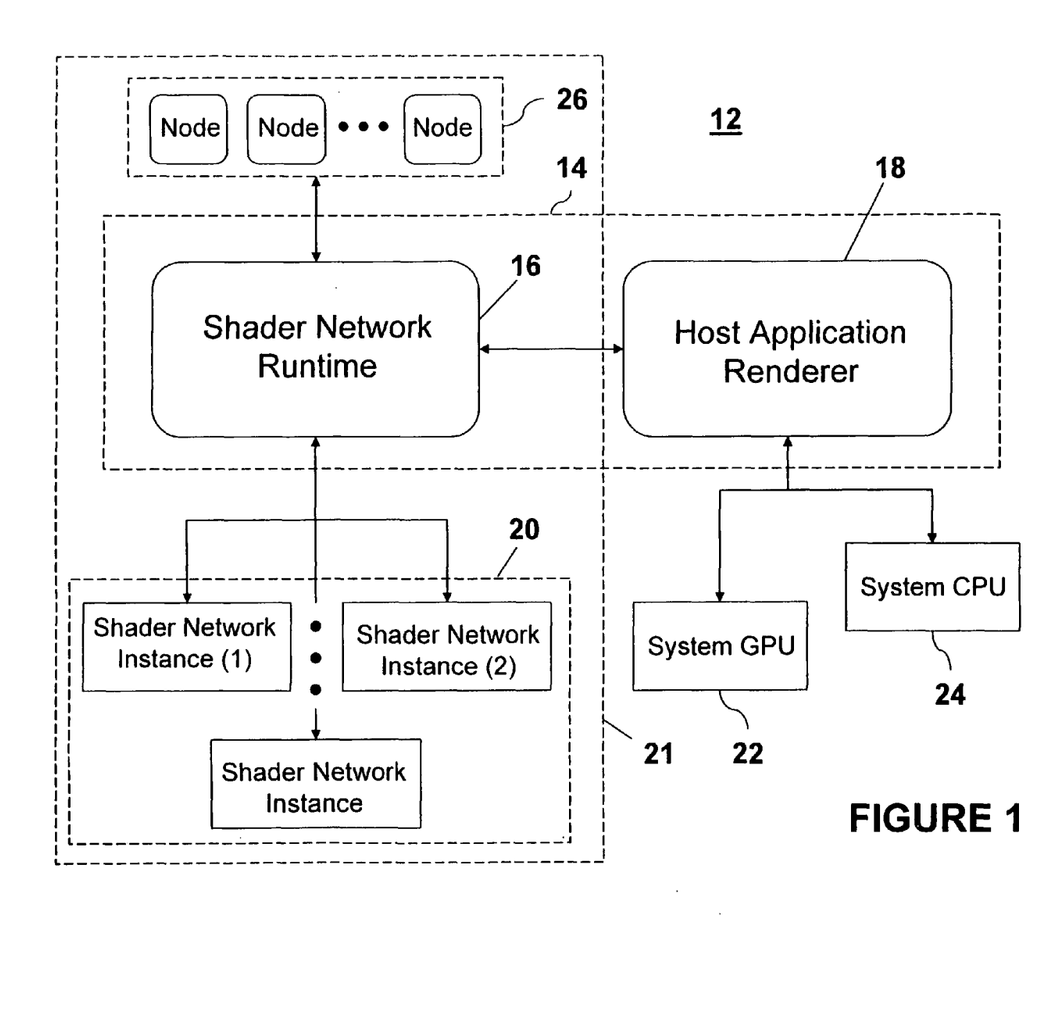
FIG. 1 is a depiction of an exemplary shader network system.

FIG. 1 depicts an exemplary shader network system 12. Shader network system 12 comprises host application 14, shader network runtime 16, host application renderer 18, shader network instances 20, system graphics processing unit (GPU) 22, system central processing unit (CPU) 24, and shader nodes 26. Shader network 21 comprises the configuration of shader nodes 26 and shader network instances 20, linkable via shader network runtime 16. In an exemplary embodiment, shader network runtime 16 provides the ability to load and evaluate instances of shader network 20. As described in more detail below, evaluation involves selecting one of several possible shader nodes and/or branches depending upon the value of an expression. Each shader network instance comprises at least one shader node 26. A shader network comprises a configuration of shader nodes that can be communicate via input and output pins on each shader node. A shader network instances accesses shader nodes via shader network runtime 16. Shader network runtime 16 is hosted within host application 14. Shader network runtime 16 communicates with the host application's graphics renderer 18. Communication between shader network instances 20 and shader network runtime 16 or between shader network runtime 16 and host application renderer 18 can cause the host application renderer 18 to execute CPU (24) and/or GPU (22) code related to active shader network instances.

Figure 2:
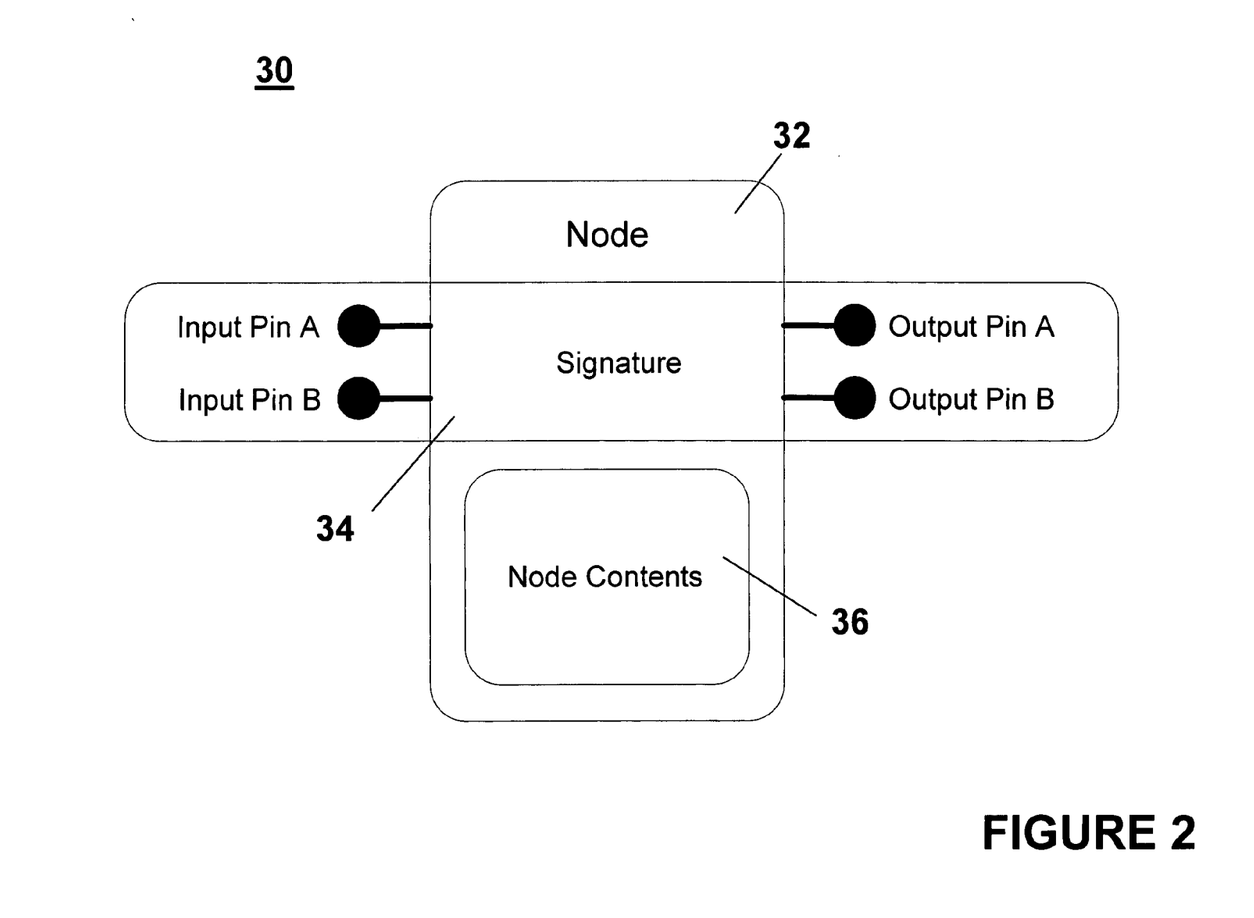
FIG. 2 is a diagram of an exemplary shader node.

FIG. 2 is a diagram of an exemplary shader node 30. Shader node 30 is a self contained fully portable node indicative of a renderable shading effect, or effects. Shader nodes are reusable and can be composed with other shader nodes into a shader network (e.g., shader network 21). Shader nodes can be considered as basic building blocks of a shader network.

The collection of shader nodes in the shader network defines the CPU and GPU behavior necessary to implement a particular shading technique. A shader node contains information encapsulating CPU and GPU behavior as well as describes inputs and outputs of the given node. Shader node 30 comprises a portion 32 indicative of the type of shader node 30, a signature portion 34 indicative of permissible data transferable into and out of the shader node 30, and a contents portion 36 comprising information indicative of functions performable by the shader node 30. Shader node 30 also comprises input and output pins via which data is transferred into and out of, respectively, shader node 30. Input pins and output pins represent communications links used to communicate with shader network instances and other shader nodes, via the shader network runtime. In an exemplary embodiment, a shader node is represented by a single XML file that encapsulates the declaration of the node name 32, type signature 34, and node contents 36.

Figure 3:
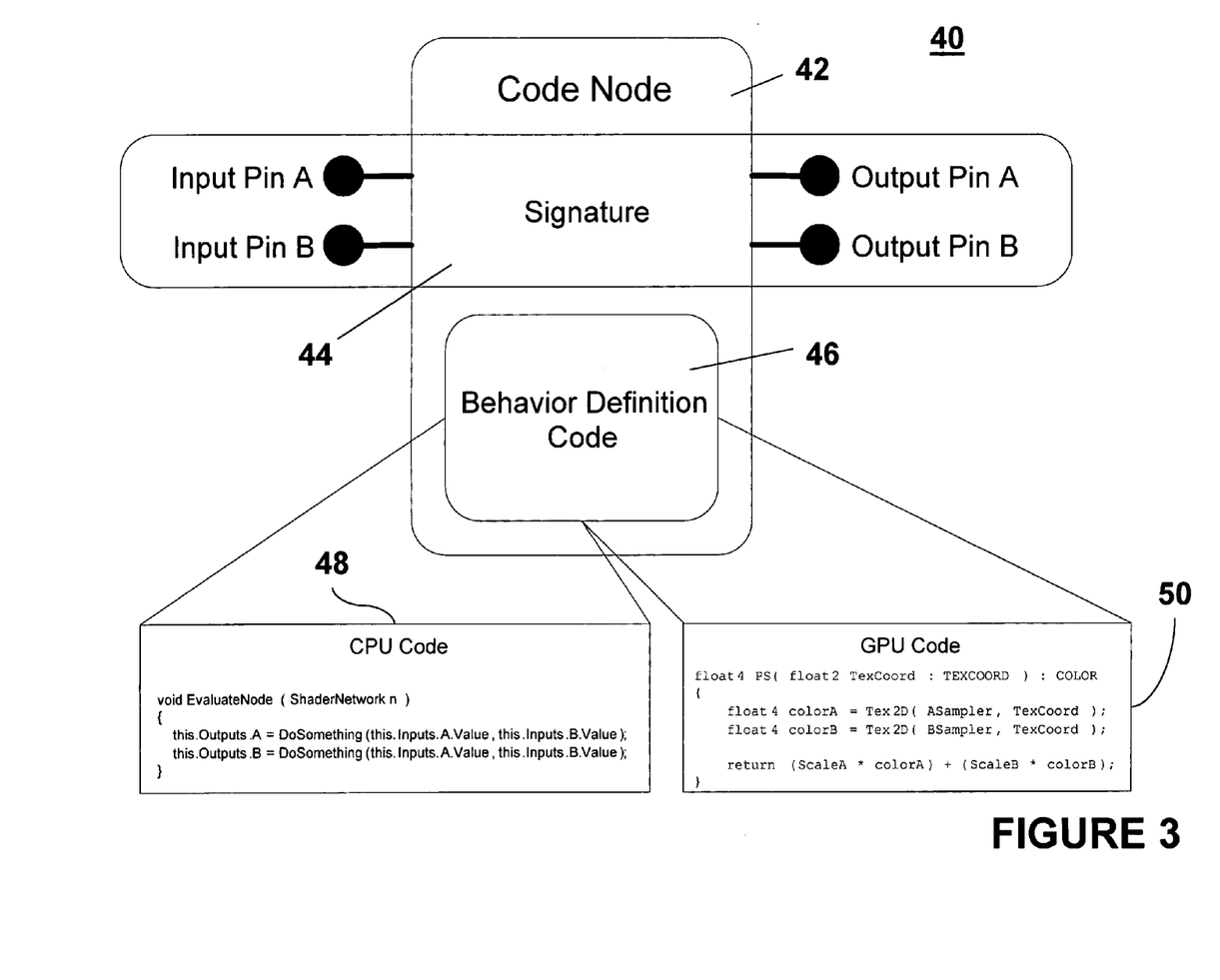
FIG. 3 is an illustration of an exemplary code node.

In an exemplary shader network, there are three types of shader nodes: a code node, a datum node, and a macro node. FIG. 3 is an illustration of an exemplary code node 40. As is the case with all shader nodes, code node 40 comprises a portion indicative of the type of shader node (42), a signature portion indicative of permissible data transferable into and out of the shader node (44), and a contents portion comprising information indicative of functions performable by the shader node (46). Code node 40 also comprises input and output pins via which data is transferred into and out of, respectively, code node 40. Input pins and output pins represent communications links used to communicate with shader network instances and other shader nodes, via the shader network runtime. Portion 42 indicates that shader node 40 is a code node.

Signature portion 44 indicates the types of data that can be received by and provide by code node 40. Signature portion 44 defines the set of input and output pins available on code node 40. Signature portion 44 defines how code node 40 can be connected within the shader network system. Within signature portion 44, is contained a declaration of each pin comprising information about data that flows in or out of code node 40. Information such as the name, data type, default value, direction (in or out), and connectivity constraints, for example, are declared for each pin within signature portion 44.

Exemplary data types include shading effects and high level shading language types (e.g., D3DX and MICROSOFT® HLSL), signature, canvas, and drawlist. A signature is an object used as a data type that allows indirect execution of shader nodes. A canvas is an abstraction of a host renderer's render target or frame buffer. A drawlist is a loosely typed container indicative of a subset of renderable scene elements.

A code node can be thought of as a fundamental unit of orchestration in a shader network. Code nodes provide an abstract extensibility mechanism by which programmers can extend the shader network. Code nodes provide the shader network extensible CPU and GPU behavior through interactions with the shader network runtime and the host application renderer. Thus, in various embodiments, a code node can provide CPU behavior only, or a combination of CPU behavior and GPU behavior. The contents portion of a code node can contain a portion (snippet) of CPU orchestration code 48 written in a managed programming language. The contents of a code node also can contain a behavioral code 50 (e.g., in the form of D3DX effects and/or MICROSOFT® HLSL code snippets) for the GPU. In an exemplary embodiment, a managed programming language, such as C#, J#, VB .Net, Jscript .Net, or C++, for example, can be utilized to create CPU orchestration code. CPU orchestration code is managed code that has its execution managed by a shader network runtime. In an exemplary embodiment, C# is utilized as a managed programming language. And, the shader network runtime uses CPU and GPU code snippets together with the code node's signature to generate a unique C# class object (i.e., "Derived Code Node Class") that implements the orchestration. The Derived Code Node Class object is utilized by the shader network runtime when executing a shader network instance that contains that node. It is to be understood that managed code is not necessary, and in an exemplary embodiment, the signature portion can contain information indicative execution procedures.

CPU behavior code 48 has full access to the shader network runtime 16, the enclosing shader network 21, node attributes such as the signature portion and the node contents portion, and per-instance and per-class stored state. The level of access to state in the shader network combined with access to abstract rendering operations such as "render the scene" or "apply Shader Network A to scene element B," for example, provide an exceptional level of rendering complexity while maintaining full portability to other host renderers.

Figure 4:
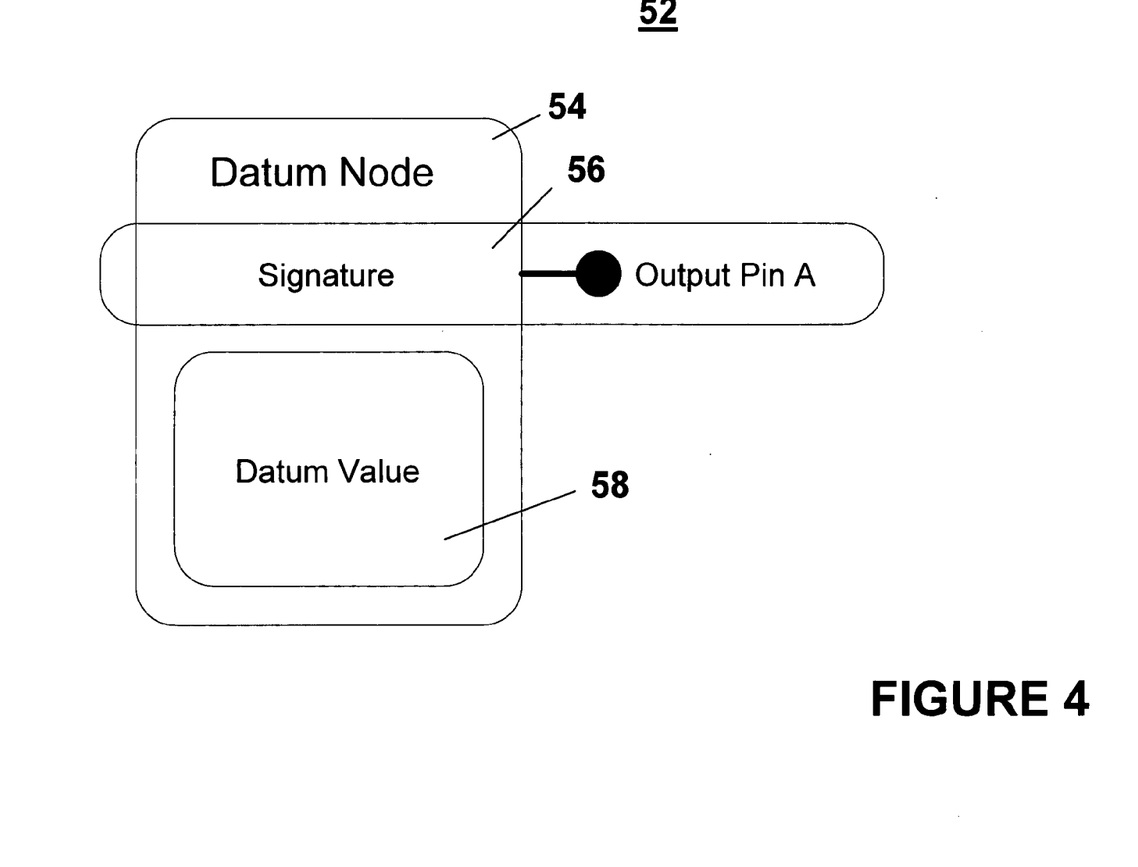
FIG. 4 is an illustration of an exemplary datum node.

FIG. 4 is an illustration of an exemplary datum node 52. As do all shader nodes, datum node 52 comprises a portion indicative of the type of shader node (54), a signature portion indicative of permissible data transferable into and out of the shader node (56), and a contents portion comprising information indicative of functions performable by the shader node (58). Datum node 52 also comprises input and output pins via which data is transferred into and out of, respectively, shader node 52. Input pins and output pins represent communications links used to communicate with shader network instances and other shader nodes, via the shader network runtime. Portion 54 indicates that shader node 52 is a datum node. Contents portion 58 of datum node 52, comprises data indicative of a constant value stored therein. Datum nodes provide a mechanism for storing constant data within the datum node and thus within the shader network system itself. Having a constant data value stored within the shader network can be advantageous, for example, when it is desired to have the ability to lock a parameter of a shading technique to a specific value at authoring time. For example, it may be desired, when building a shader network, to specify that a "Shininess" value of a particular node in the shader network be locked to "0.5". Datum nodes provide this level of functionality. Conceptually, a datum node can be thought of as a shader node that provides, as output, a single value of a known type (e.g., 'float') that is stored in the node contents portion. Datum nodes are also advantageous when it is desired to ensure that the same data value is used for inputs of several different nodes.

Figure 5:
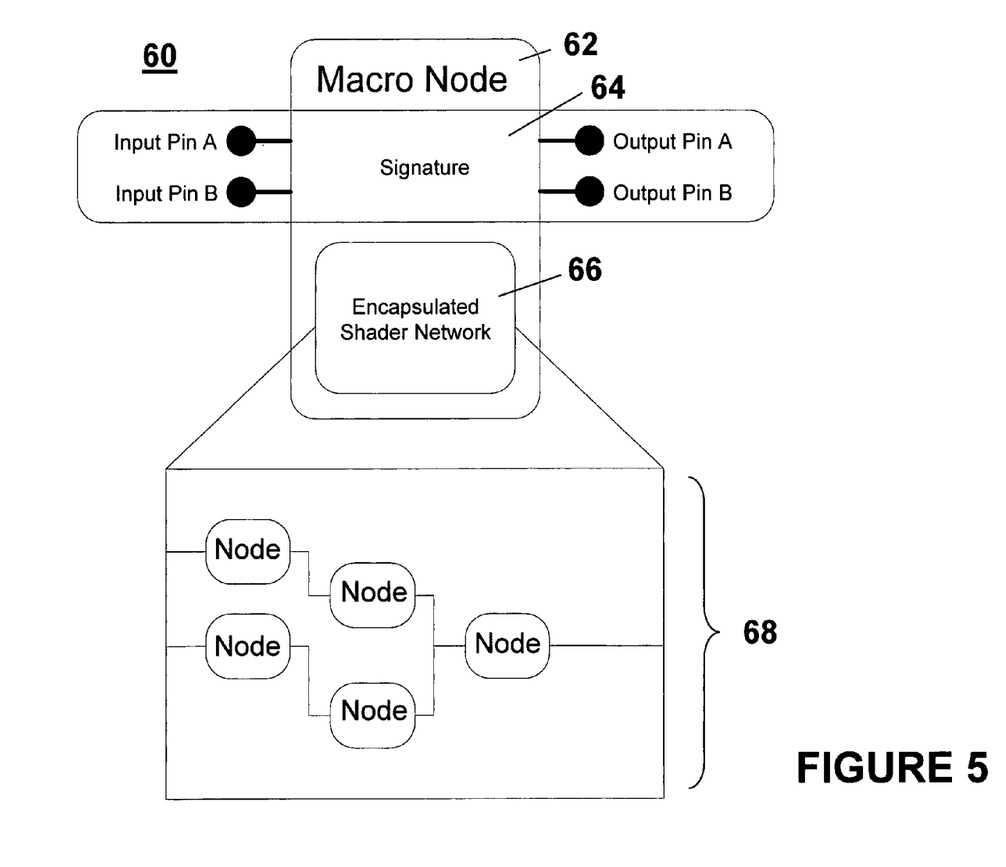
FIG. 5 is an illustration of an exemplary macro node.

FIG. 5 is an illustration of an exemplary macro node 60. As do all shader nodes, macro node 60 comprises a portion indicative of the type of shader node (62), a signature portion indicative of permissible data transferable into and out of the shader node (64), and a contents portion comprising information indicative of functions performable by the shader node (66). Portion 62 indicates that shader node 60 is a macro node. Contents 68 of contents portion 66 of macro node 60 comprises at least one shader node stored therein. As depicted in FIG. 5, contents 68 comprises a configuration of shader nodes. A macro node provides a mechanism for authors to reuse a configuration of shader nodes (68) as if the configuration were a single shader node. This level of author-driven, hierarchical, recursive composition provides a unique and powerful tool for authors and/or artists implementing shading effects. From an author's/artist's perspective, using a macro node is similar to using a code node. Unlike code nodes though, macro nodes do not require original code generation or derivation of any sort. The macro node's CPU and GPU behavior comes from the aggregation of nodes contained within the macro node's contents portion.

Figure 6:
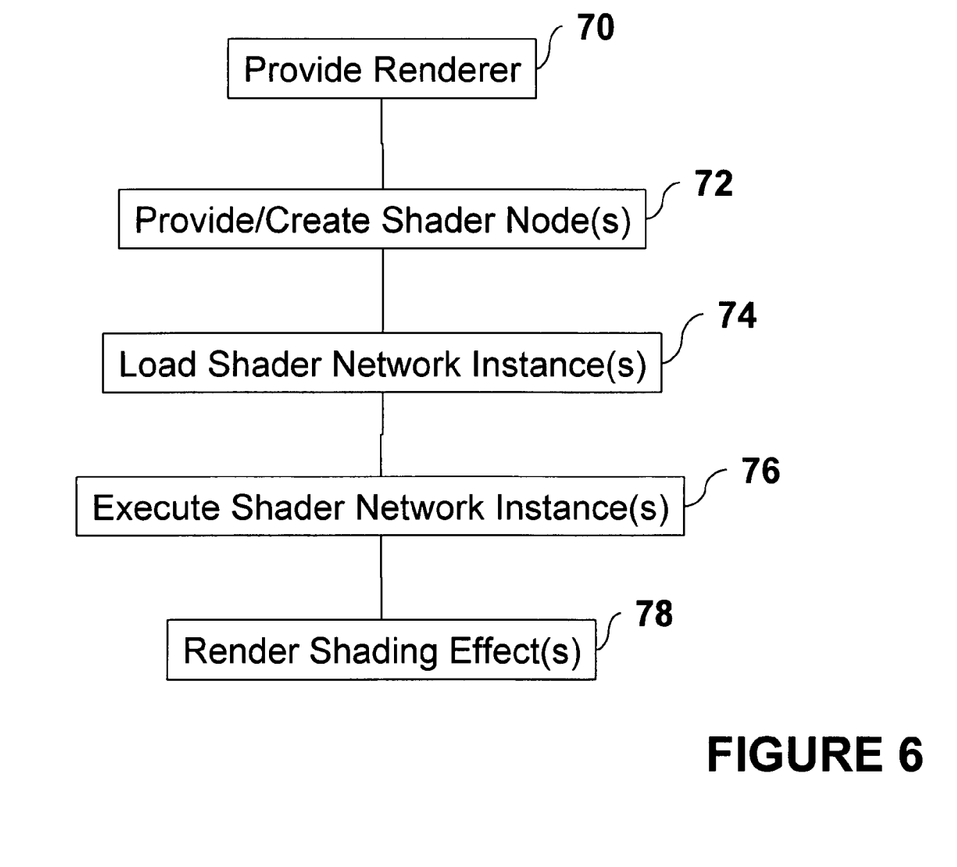
FIG. 6 is a flow diagram of an exemplary process for rendering shading.

FIG. 6 is a flow diagram of an exemplary process for rendering shading. A renderer is provided at step 70. The provided renderer can comprise any appropriate renderer, such as application renderer 18, for example. The renderer can be part of a host application, such as a graphics editor, for example. At least one shader node is provided at step 72. Providing a shader node can include creating a shader node. As described above, a shader node can comprise a code node, a datum node, and/or a macro node. Providing at least one shader node also can comprise constructing a graph of connected shader nodes, i.e., a shader network. The graph can be constructed by an author and/or artist. At least one shader network instance is loaded at step 74. As described above, in an exemplary embodiment, a shader network runtime loads shader network instances. The loaded shader network instance(s) is executed at step 76. The desired (also referred to as a target) shading effect, or effects, is rendered at step 78.

At runtime, the shader network runtime is responsible for the evaluation of a particular configuration of shader nodes (shader network). Evaluation involves selecting one of several possible shader nodes and/or branches depending upon the value of an expression. The host application is responsible for initiating the process of evaluation based on application-specific needs. The host invokes the shader network runtime on a shader network by instructing the shader network runtime to evaluate the shader network for a particular set of output pins on a particular set of shader nodes. Once the shader network runtime is invoked to evaluate a shader network, the shader network runtime handles evaluation of the shader network.

Figure 7:
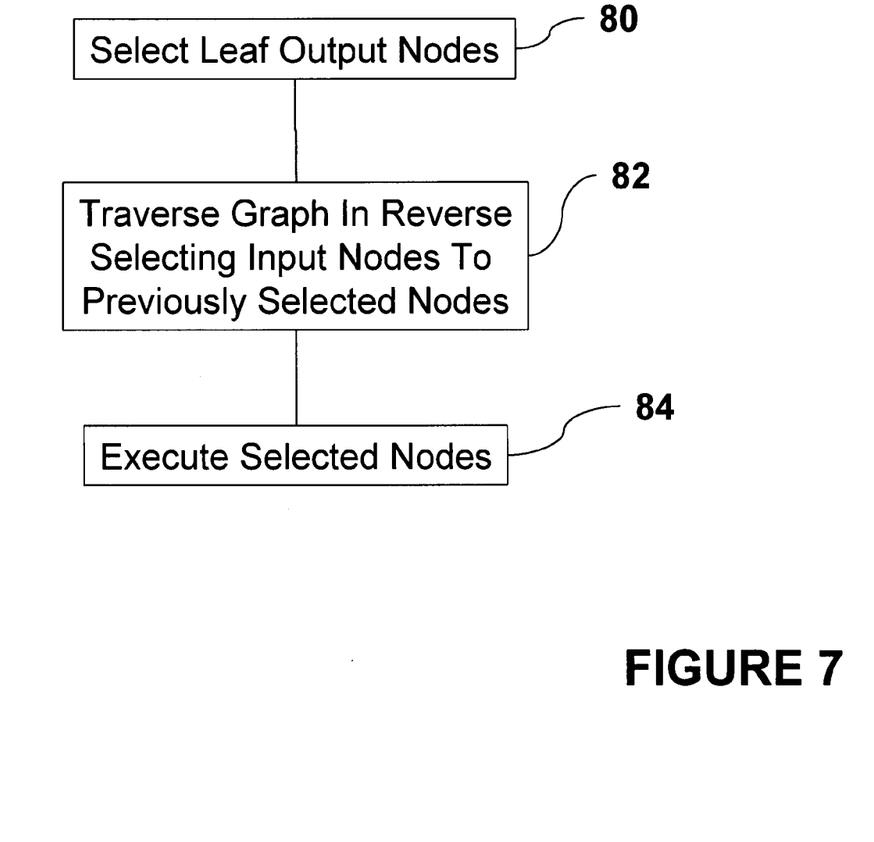
FIG. 7 is a flow diagram of an exemplary process for evaluating a shader network.

FIG. 7 is a flow diagram of an exemplary process for evaluating a shader network. In an exemplary embodiment in which a configuration of shader nodes (shader network) is constructed as a graph, shader network evaluation comprises shader node selection followed by shader node execution. The shader network runtime starts evaluation of a shader network by selecting all of the leaf output shader nodes, at step 80 (those specified by the host application) and placing them in a NeedingEvaluation set. The graph is traversed in reverse (from output shader nodes), selecting input shader nodes to previously selected shader nodes at step 82. That is, for each shader node (TargetNode) in the NeedingEvaluation set, the shader network runtime prepends those shader nodes connected as inputs (InputNodes) to the TargetNode to the NeedingEvaluation set. This process continues until no more InputNodes exist for any TargetNodes. Once the shader node selection process is complete, shader node execution commences at step 84. Shader node execution traverses through all shader nodes in the NeedingEvaluation set calling each shader node's EvaluateNode method of the Derived Code Node Class. Execution of the EvaluateNode method causes the shader node to execute its CPU behavior code which in turn results in the reading of the shader node's input pins and then updating of the values of its output pins. The ordering determined in the shader node selection phase ensures that a given code node's input pins have their proper values before executing the EvaluateNode method of a dependent shader node.

A code node's EvaluateNode method also communicates with the shader network runtime in order to affect rendering in the system, thereby orchestrating the rendering. A code node can invoke the host renderer in numerous ways and provide all necessary GPU behavior code and state at that time. In this manner, code nodes contain both CPU and GPU behavioral code.

The process described above for the evaluation of a shader network is sufficient to meet the goal of evaluating CPU and GPU behavioral code. To mitigate potential performance issues however, in an exemplary embodiment, the shader network system implements evaluation frequency and automatically caches values of output pins of code nodes. A code node can declare that it should be re-evaluated at particular frequencies. In an exemplary embodiment, the following evaluation frequencies are implemented: static evaluation, instance evaluation, and quantum evaluation. The host application is responsible for declaring to which frequency a particular evaluation invocation belongs.

Static evaluation occurs once per type of code node. For example, if a code node named "Looper" exists, static evaluation would occur exactly once regardless of how many Looper Nodes were used in all shader networks in the system. Instance evaluation occurs exactly once per instance of a code node. Continuing the example above, instance evaluation would occur for every Looper node used in the system. Quantum evaluation occurs once per "quantum" (unit of time) in the system. The shader network relies on the host application to notify the shader network runtime when a new quantum occurs. Attempts to re-evaluate an instance of particular code node during the same quantum result in cached values being used for the node's output pin values.

Figure 8:
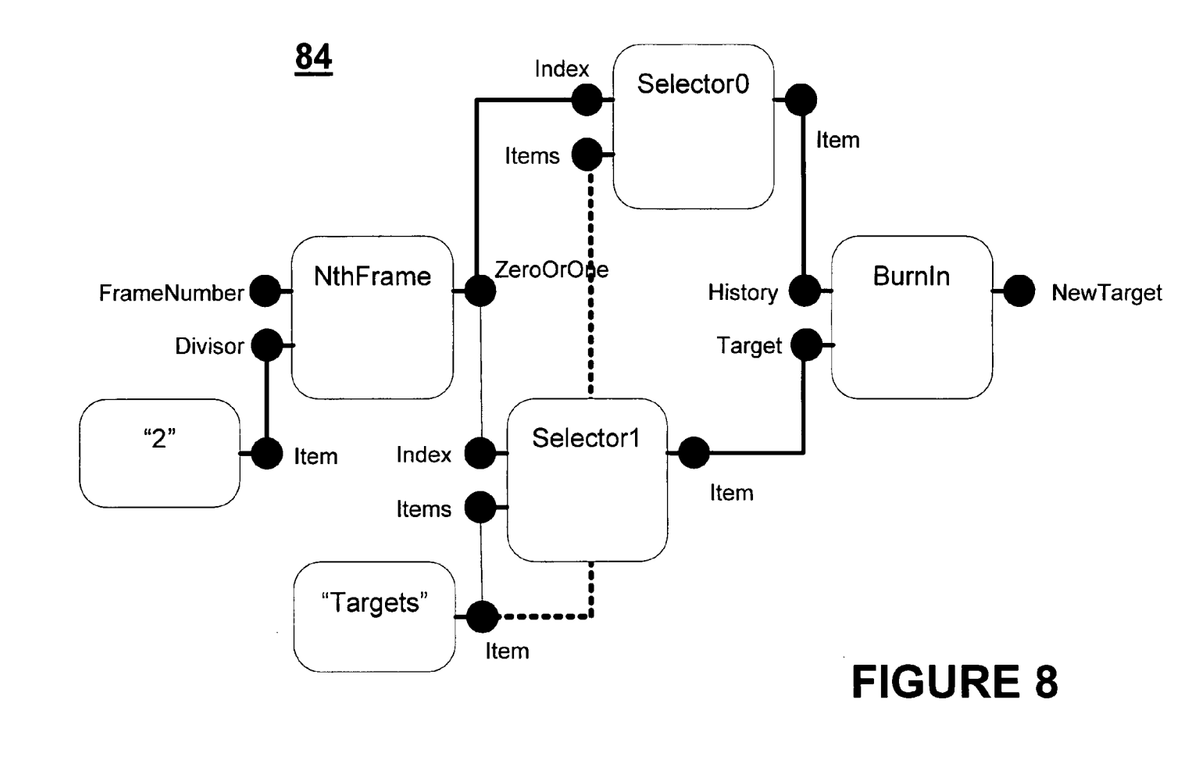
FIG. 8 is a diagram of an exemplary constructed shader network.

FIG. 8 is a diagram of an exemplary constructed shader network 84. The following is a description of an exemplary evaluation scenario of shader network 84. In this exemplary evaluation scenario the host application requested the output "NewTarget" of the "BurnIn" node. As described above, the shader network runtime starts evaluation of a shader network by selecting all of the leaf output shader nodes and placing them in a NeedingEvaluation set. Accordingly, "BurnIn" is prepended to the NeedingEvaluation list. "Selector0" and "Selector1" are connected to the inputs of the "BurnIn" node so they are prepended to the NeedingEvaluation list. "NthFrame" is connected to the input of the "Selector0" node so it is prepended to the NeedingEvaluation list. "2" is connected to the input of the "Selector0" node so it is prepended to the NeedingEvaluation list. "NthFrame" is connected to the input of the "Selector 1" node but because it is already in the NeedingEvaluation list, it is not added again. "Targets" is connected to the input of the "Selector1" node so it is prepended to the NeedingEvaluation list. At this point, all connected nodes of shader network 84 have been selected into the NeedingEvaluation list. The nodes would have their EvaluateNode method called in the following order: "Targets," "2," "NthFrame," "Selector0," "Selector1," and "BurnIn." Finally, the value of the NewTarget pin on the "BurnIn" node is returned to the host application.

As described above, a pin can be declared to have a data type of "Signature." Moreover, the shader network runtime provides a mechanism by which authors can connect an instance of a macro node to a pin declared with signature. This connectivity results in the ability to pass an entire shader network through the system as data. The CPU code within a shader node that has a signature pin can invoke the shader network runtime to evaluate the connected shader network and retrieve the output(s) of that shader network. For example, a code node "Looper" can be defined having an input signature pin named "Loop." An author can use the "Looper" code node and can connect a shader network (e.g., "Incrementer") to the Loop pin. During evaluation of the resultant shader network, the Looper code node will evaluate the "Incrementer" shader network as many times as necessary (as controlled by the Looper code node). This "indirect evaluation" provides a mechanism by which iteration and flow control can be exposed in the shader network system.

Figure 9:
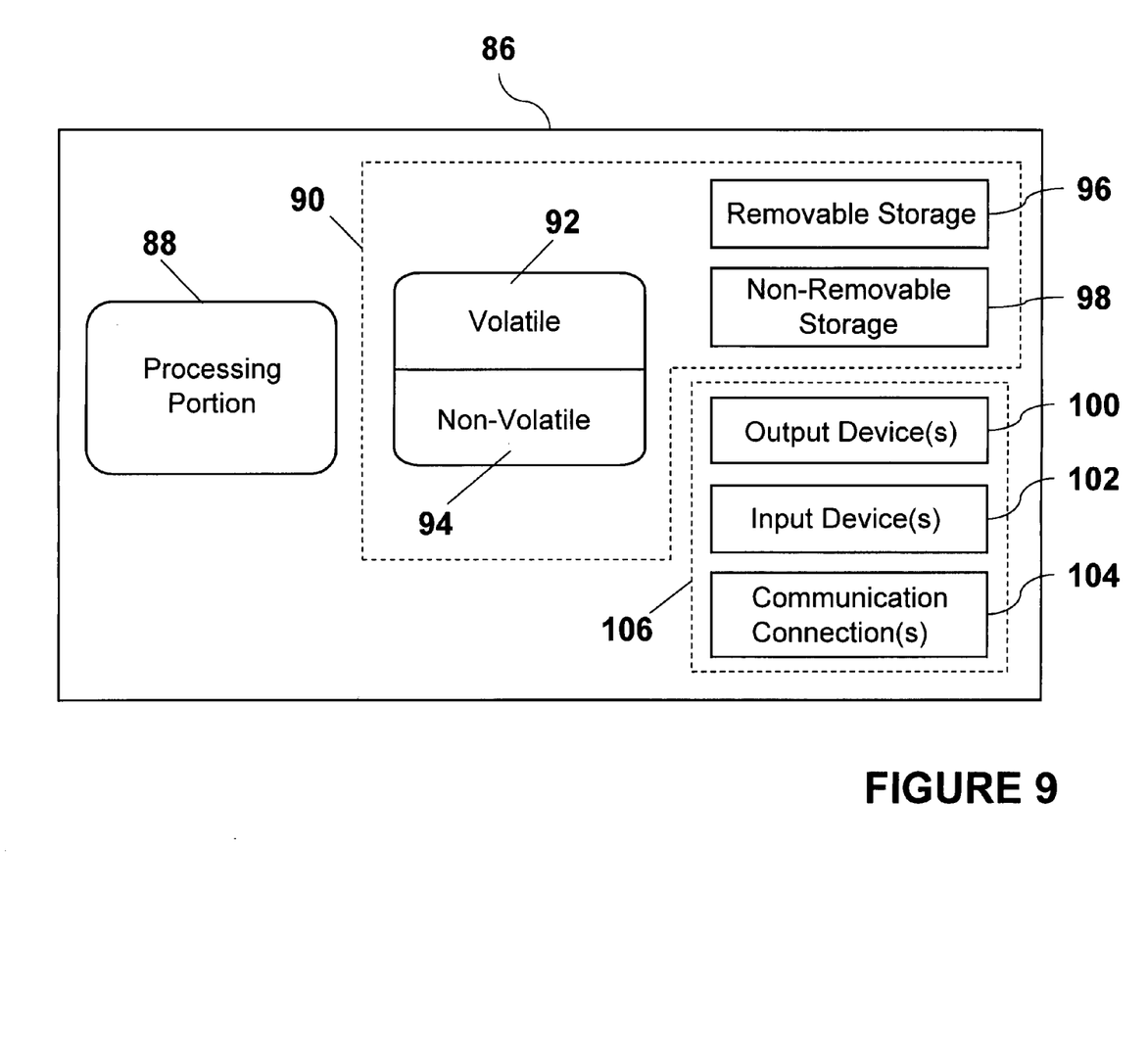
FIG. 9 is a diagram of an exemplary computing device for implementing a shader network.

FIG. 9 is a diagram of an exemplary computing device 86 for implementing a shader network. For example, computing device 86 can implement shader network runtime 16, shader network instances 20, and shader nodes 26 of shader network 21. In another example, computing device 86 can comprise shader network system 12. Computing device 86 comprises a processing portion 88, a memory portion 90, and an input/output portion 106. The processing portion 88, memory portion 90, and input/output portion 106 are coupled together (coupling not shown in FIG. 9) to allow communications therebetween. The processing portion 88 is capable of rendering shading effects and evaluating shader networks as described above. The memory portion 90 is capable of storing all parameters described above, such as shader nodes, shader network graphs, and any additional information, for example. Input/output portion 106 is capable of providing and/or receiving the components described above utilized to implement a shader network.

Computing device 86 can be implemented as a client processor and/or a server processor. In a basic configuration, computing device 86 can include at least one processing portion 88 and memory portion 90. Depending upon the exact configuration and type of processor, memory portion 90 can be volatile (such as RAM) 92, non-volatile (such as ROM, flash memory, etc.) 94, or a combination thereof. Computing device 86 can have additional features/functionality. For example, computing device 86 can include additional storage (removable storage 96 and/or non-removable storage 98) including, but not limited to, magnetic or optical disks, tape, flash, smart cards or a combination thereof. Computer storage media, such as memory portion 90, 92, 94, 96, and 98, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by computing device 86. Any such computer storage media can be part of computing device 86.

Computing device 86 can also contain communications connection(s) 104 that allow the computing device 86 to communicate with other devices. Communications connection(s) 104 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media. Computing device 86 also can have input device(s) 102 such as keyboard, mouse, pen, voice input device, touch input device, etc. Output device(s) 100 such as a display, speakers, printer, etc. also can be included.

A shader node as described herein encapsulates both CPU and GPU related codes into a single, self-contained, transportable entity. This encapsulation results in the production of reusable shading techniques. Further, an author utilizing the herein described shading network system is provided the ability to compose multiple nodes into a reusable "macro" node that affords the author the ability to build derivative shading effects without the need to modify the application's renderer or the constituent nodes. The shader network system also utilizes code generation to reduce the amount of CPU and GPU behavior code that the shader node authors must write. The herein described shader network system also exposes iteration and control flow within a shader network. Shader nodes within a shader network can execute another shader network that has been specified as parameter data in a graph. This indirect execution of a shader network is a basic primitive on which loop and control flow constructs can be exposed without complicating the evaluation model of the shader network.

The various techniques described herein can be implemented in connection with hardware or software or, where appropriate, with a combination of both. Thus, the methods and apparatuses for shader networks or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes a shader network apparatus. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language may be a compiled or interpreted language, and combined with hardware implementations.

The methods and apparatuses for shader networks also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for implementing a shader network. When implemented on a general-purpose processor, the program code combines with the processor to provide a unique apparatus that operates to invoke the functionality of a shader network. Additionally, any storage techniques used in connection with shader networks can invariably be a combination of hardware and software.

While shader networks have been described in connection with the exemplary embodiments of the various figures, it is to be understood that other similar embodiments can be used or modifications and additions can be made to the described embodiments for performing the same functions of a shader network without deviating therefrom. Therefore, shader networks as described herein should not be limited to any single embodiment, but rather should be construed in breadth and scope in accordance with the appended claims.

What is claimed:

1. An apparatus comprising:
a processor; and
memory coupled to the processor, the memory comprising executable instructions that when executed by the processor cause the processor to effectuate operations comprising:
constructing a graph representing a first configuration of shader nodes of a plurality of shader nodes, each shader node of the plurality of shader nodes being indicative of renderable shading functionality and being compatible with a plurality of renderers, wherein a renderer renders a shading effect;
traversing the graph in reverse order by:
selecting an output shader node;
pre-pending to the selected output shader node, at least one input shader node;
executing central processing unit orchestration code encapsulated inside the selected output shader node for reading one or more input pins of the selected output shader node; and
updating a value of at least one output pin of the selected output shader node based on reading the one or more input pins;
invoking shading functionality of a selected shader node; and
rendering the shading effect on a display device in accordance with the invoked shading functionality.

2. The apparatus of claim 1, wherein at least one shader node is represented by a single XML file encapsulating a code name, a type signature, and node content.

3. The apparatus of claim 1, wherein:
at least one shader node is indicative of at least one shading effect;
a shader network instance has access to said at least one shader node via a shader network runtime; and
said at least one shader node is compatible with a plurality of application renderers.

4. The apparatus of claim 3, wherein a shader node developed for use with a first application renderer is fully transportable for use with a second application renderer.

5. The apparatus of claim 1, wherein at least one shader node of the plurality of shader nodes is referencable by a shader network runtime.

6. The apparatus of claim 1, wherein at least one shader node of the plurality of shader nodes comprises central processing unit orchestration code written in Jscript.

7. The apparatus of claim 1, wherein:
at least one shader node of the plurality of shader nodes comprises a datum node; and
a contents portion of said datum node has data indicative of a constant value.

8. The apparatus of claim 1, wherein at least one shader node of the plurality of shader nodes comprises a macro node, and wherein a contents portion of said macro node has at least one shader node.

9. A method for rendering shading, said method comprising:
providing a renderer for rendering at least one shading effect on a display device;
providing a plurality of shader nodes, each shader node indicative of renderable shading functionality and compatible with a plurality of renderers;
providing a shader network comprising said plurality of shader nodes and at least one shader network instance;
evaluating said plurality of shader nodes, the evaluating comprising:
constructing a graph representing a first configuration of shader nodes among the plurality of shader nodes;
traversing the graph in reverse order by:
selecting an output shader node;
pre-pending to the selected output shader node, at least one input shader node;
executing a Central Processing Unit (CPU) orchestration code encapsulated inside the selected output shader node for reading one or more input pins of the selected output shader node; and
updating a value of at least one output pin of the selected output shader node based on reading the one or more input pins;
executing said at least one shader network instance to invoke shading functionality of a selected shader node; and
rendering said at least one shading effect on a display device in accordance with said invoked shading functionality.

10. A method in accordance with claim 9, wherein at least one shader node in said plurality of shader nodes comprises:
a signature portion indicative of permissible data transferable into and out of a respective shader node; and
a contents portion comprising information indicative of functions performable by a respective shader node.

11. A method in accordance with claim 10, wherein at least one of said plurality of shader nodes comprises a code node, and wherein a contents portion of a respective code node has code stored therein:
a portion of orchestration code of a central processing unit; and
a portion of behavioral code of a graphics processing unit.

12. A method in accordance with claim 10, wherein at least one of said plurality of shader nodes comprises a datum node, wherein a contents portion of a respective datum node has data indicative of a constant value stored therein.

13. A method in accordance with claim 10, wherein at least one of said plurality of shader nodes comprises a macro node, wherein a contents portion of a respective macro node has at least one shader node stored therein.

14. A method in accordance with claim 9, further comprising loading, via a shader network runtime, said at least one shader network instance, wherein said shader network runtime functions as an interface between said renderer and said at least one shader network instance.

15. A method in accordance with claim 9, wherein a shader node developed for use with a first renderer is fully transportable for use with a second renderer.

16. A memory comprising executable instructions that when executed by a processor cause the processor to effectuate operations comprising:
constructing a graph representing a first configuration of shader nodes of a plurality of shader nodes, each shader node of the plurality of shader nodes being indicative of renderable shading functionality and being compatible with a plurality of renderers, wherein a renderer renders a shading effect;
traversing the graph in reverse order by:
selecting an output shader node;
pre-pending to the selected output shader node, at least one input shader node;
executing central processing unit orchestration code encapsulated inside the selected output shader node for reading one or more input pins of the selected output shader node; and updating a value of at least one output pin of the selected output shader node based on reading the one or more input pins;

invoking shading functionality of a selected shader node; and rendering the shading effect on a display device in accordance with the invoked shading functionality.

17. The memory of claim 16, wherein at least one shader node of the plurality of shader nodes comprises behavioral code of a graphics processing unit that defines behavior needed for implementing a first shading technique among a plurality of shading techniques.

18. The memory of claim 16, wherein a shader node developed for use with a first display device renderer is fully transportable for use with a second display device renderer.

* * * * *